Patented Aug. 31, 1948

2,448,082

UNITED STATES PATENT OFFICE 2,448,082

RECOVERY OF WATER-SOLUBLE CELLULOSE ESTERS

Robert M. Creamer, Cumberland, Md., assignor to Celanese Corporation of America, a corporation of Delaware No Drawing. Application May 3, 1945,
Serial No. 591,835

13 Claims. (Cl. 260—230)

This invention relates to the preparation of water-soluble organic acid esters of cellulose, such as, for example, water-soluble cellulose acetate, and relates more particularly to an improved process for the recovery of said water-soluble organic acid esters of cellulose from the solutions in which they are prepared.

In the production of water-soluble cellulose acetate, or other water-soluble organic acid esters of cellulose, by processes wherein cellulose is esterified in an esterification medium comprising an organic acid anhydride, an acid esterification catalyst and a diluent, or solvent, for the cellulose ester formed, and the organic acid esters of cellulose produced are then hydrolyzed or ripened in solution to such a relatively low acyl value as to impart water-solubility thereto, the satisfactory recovery of the water-soluble esters from the acid solution presents a distinct problem. The removal of the water as well as the organic acids normally present in the solution in which ripening is effected usually requires that the water-soluble cellulose ester be precipitated from solution by the addition thereto of a water-soluble organic liquid which is a non-solvent for the cellulose ester. The precipitated ester is then extracted with a suitable organic liquid, such as ethyl alcohol, to remove the acid still remaining on the precipitated water-soluble ester, and is then treated with a suitable volatile organic liquid having no solvent action on the cellulose ester but adapted to remove the alcohol employed for removing the acid solvent. The several steps involved in such a process together with the necessity for employing several different organic liquids during the purification, a substantial proportion of which cannot be recovered, or, if recovered, must be purified if they are to be recycled in the process, makes the operation relatively costly and uneconomic.

It is, therefore, an important object of my invention to provide an efficient and economical process for the recovery of water-soluble organic acid esters of cellulose from the solutions in which they are formed.

Another object of my invention is the separation and purification of water-soluble organic esters of cellulose by a direct process which avoids the use of a plurality of organic precipitants and extractants.

A further object of my invention is the provision of a novel recovery process for recovering water-soluble organic esters of cellulose by direct extraction of the aqueous acid solution containing the organic ester of cellulose after the desired ripening is effected.

Other objects of my invention will appear from the following detailed description.

In accordance with the novel process of my invention, water-soluble organic acid esters of cellulose may be recovered from the aqueous acid solution in which they are present after said esters have been ripened to the desired degree of water-solubility, by neutralizing the acid catalyst in the solution, subjecting the aqueous solution to counter-current extraction with a substantially water-insoluble organic solvent whereby the organic acid present is substantially completely removed and then evaporating, distilling or otherwise removing the water from the aqueous cellulose ester solution remaining to produce a dry product or an aqueous solution of any desired concentration of the water-soluble cellulose ester. The water-soluble organic acid esters of cellulose obtained by our novel recovery process exhibit excellent stability characteristics and may be employed satisfactorily in the preparation of water-soluble films, foils, filaments and the like or for use wherever water-soluble organic esters of cellulose are of advantage.

Various organic extractants may be employed in effecting the counter-current extraction of the acid from the aqueous solution in which the organic ester of cellulose is ripened to water-solubility. While extractants such as, for example, ethyl acetate, butyl acetate, petroleum ether and mixtures thereof may be employed satisfactorily, optimum results are obtained employing isopropyl ether or mixtures of ethyl acetate and benzene as the extractant, the most effective mixture of ethyl acetate and benzene comprising 70% of ethyl acetate and 30% of benzene. The extraction may be effected at temperatures of from 10 to 70° C. but I preferably carry out the extraction at a temperature of about 40° C. The acid present is reduced by the extraction step so that the extracted solution contains no more than about 0.01 to 1.0% of acid.

While it is to be understood that the novel recovery process of my invention may be employed in connection with the separation or recovery of various water-soluble organic acid esters of cellulose such as water-soluble cellulose acetate, cellulose propionate, cellulose butyrate, cellulose acetate-propionate and cellulose acetate-butyrate, it will be more particularly described in connection with the separation and recovery of water-soluble cellulose acetate.

The water-soluble cellulose acetate may be prepared by acetylating cellulose, with or without an activating pretreatment with organic acids or organic acids containing some sulfuric acid, by employing an esterifying medium comprising acetic anhydride and an acid esterification catalyst, such as sulfuric acid, together with glacial acetic acid which acts as a solvent for the cellulose acetate formed. The sulfuric acid catalyst may be present in amounts of from 9 to 15% or even 20% on the weight of the cellulose. Part of the sulfuric acid catalyst may be introduced during the pretreatment which is designed to render the cellulose more reactive. When acetylation is completed water is stirred into the reaction mixture to convert the excess acetic anhydride to acetic acid and, after the addition of a further quantity of water, the resulting solution of cellulose acetate in acetic acid containing the sulfuric acid employed as the catalyst is permitted to stand and to ripen until the cellulose acetate reaches water solubility, i. e. when the cellulose acetate has an acetyl value of about 19 to 29%, calculated as acetic acid. Preferably, ripening is effected at an elevated temperature in the presence of a substantially reduced amount of catalyst in a plurality of stages, in accordance with the process disclosed in U. S. Patent No. 2,329,706, the temperature, the amount of catalyst and water present during ripening being adjusted in the several stages as described therein. The ripening is continued in the final stage until water solubility is reached whereupon ripening is halted and the ripened aqueous acid solution of water-soluble cellulose acetate is then subjected to my novel extraction process for recovering the water-soluble cellulose acetate contained therein.

In lieu of preparing the water-soluble cellulose acetate by a direct process involving the continuous ripening of the cellulose acetate in solution in a plurality of stages, highly advantageous results may be obtained if the water-soluble cellulose acetate is prepared from cellulose acetate which has been prepared in the usual manner and ripened to acetone solubility, e. g. to an acetyl value of 53 to 56%, calculated as acetic acid. This acetone-soluble cellulose acetate is precipitated, washed and dried, redissolved in aqueous acetic acid and then ripened at an elevated temperature of 40 to 80° C. in the presence of a small amount of added sulfuric acid to aid the ripening.

Particularly advantageous results are obtained if the acetone-soluble cellulose acetate employed for further ripening to water-solubility comprises the fines, or small, finely-divided particles of cellulose acetate, obtained on filtering the aqueous solution in which commercial, acetone-soluble cellulose acetate has been precipitated. The ripening of said fines to water-solubility in aqueous acetic acid at elevated temperature produces a water-soluble cellulose acetate of excellent characteristics. Such a process for the production of water-soluble cellulose acetate provides a very useful outlet for the utilization of such fines which are normally of such a low degree of polymerization as to be substantially worthless for the preparation of commercially valuable yarns, filaments and foils.

In order further to illustrate my invention but without being limited thereto the following examples are given:

Example I 100 parts by weight of wet, water-laden cellulose acetate fines of an acetyl value of 54%, calculated as acetic acid, and obtained by filtering the solution in which the precipitation of commercial acetone-soluble cellulose acetate of 54% acetyl value is effected, are dissolved in glacial acetic acid containing 4% on the weight of the cellulose acetate fines of sulfuric acid. The water content of the fines dilutes the glacial acetic acid so that when solution is complete the solvent comprises 70% aqueous acetic acid containing 30% by weight of water. The cellulose acetate in solution is ripened at 70° C. with gradual addition of water for 20 hours until the cellulose acetate in solution is hydrolyzed to water-solubility, the acetyl value having been reduced to a value of 21%, calculated as acetic acid. At the end of the ripening, the solvent comprises 40% aqueous acetic acid as a result of the gradual dilution. The sulfuric acid in solution is neutralized by the addition of magnesium acetate thereto. The neutralized aqueous acetic acid solution of water-soluble cellulose acetate is then subjected to counter-current extraction at a temperature of 30° C. with isopropyl ether. Extraction is continued until the acetic acid in solution has been substantially removed. If there is any acetic acid remaining in solution following extraction, it may be neutralized by the addition of sodium bicarbonate thereto. The acetic acid remaining should be no more than 0.01 to 1.0% by weight. The water-soluble cellulose acetate in the solution obtained may then be recovered therefrom by evaporating the water from the solution in any convenient manner. In some instances it may even be desirable to precipitate the water-soluble cellulose acetate from the acid-free aqueous solution by the addition thereto of a water-miscible non-solvent for the cellulose acetate such as acetone or dioxane. If desired, the aqueous solution of water-soluble cellulose acetate may be employed directly for the preparation of films, foils and the like, as well as for sizing textile fibers, coating paper or for treating films and foils.

Example II 170 parts by weight of cotton are pretreated with a mixture of acetic acid, water, and sulfuric acid for four hours at 30° C. This mixture is then placed in an acetylation bath consisting of 350 parts of acetic anhydride, 630 parts of acetic acid, and 25 parts of sulfuric acid. After one and one-half hours with the reaction reaching a peak temperature of 42° C., a triester of cellulose is produced. Enough water is then added to decompose the residual acetic anhydride after which sufficient magnesium acetate is added in aqueous solution to neutralize two thirds of the sulfuric acid present and effect the addition of 52 parts of water. The temperature of the resulting solution is kept at approximately 74° C. for hydrolysis of the cellulose acetate in solution. The hydrolysis is continued until water-solubility is attained by the cellulose acetate, this hydrolysis taking about 32 hours. During hydrolysis, 1700 parts of water are added. This water may be added stepwise or continuously, the rate of addition in either case being such that the cellulose acetate remains in solution at all times during the hydrolysis. The aqueous acetic acid solution of the water-soluble cellulose acetate is then countercurrently extracted with a mixture of 70% ethyl acetate and 30% benzene at 40° C., the extraction being continued until the acetic acid in the water solution has been reduced to below 1%. The final acid concentration in the solution may vary with its intended use. Should very low acidities be desired, extraction can be continued or residual acid may be neutralized as indicated above.

It is to be understood that the foregoing detailed description is given merely by way of illustration and that many variations may be made therein without departing from the spirit of my invention.

Having described my invention, what I desire to secure by Letters Patent is:

1. In a process for the recovery of water-soluble organic acid esters of cellulose from the aqueous aliphatic acid solution in which said esters are ripened to water-solubility and in which there is present an inorganic acid ripening catalyst employed in the ripening step, the steps which comprise neutralizing the inorganic acid ripening catalyst present in the aqueous aliphatic acid solution, and subjecting the resulting aliphatic acid solution of the organic acid ester of cellulose to extraction with a substantially water-insoluble organic extractant for the aliphatic acid selected from the group consisting of ethyl acetate, butyl acetate, petroleum ether and mixtures thereof, isopropyl ether and mixtures of ethyl acetate and benzene whereby said aliphatic acid is substantially completely extracted therefrom.

2. In a process for the recovery of water-soluble cellulose acetate from the aqueous aliphatic acid solution in which said cellulose acetate is ripened to water-solubility and in which there is present an inorganic acid ripening actalyst employed in the ripening step, the steps which comprise neutralizing the inorganic acid ripening catalyst present in the aqueous aliphatic acid solution, and subjecting the resulting aliphatic acid solution of the cellulose acetate to extraction with a substantially water-insoluble organic extractant for the aliphatic acid selected from the group consisting of ethyl acetate, butyl acetate, petroleum ether and mixtures thereof, isopropyl ether and mixtures of ethyl acetate and benzene whereby said aliphatic acid is substantially completely extracted therefrom.

3. In a process for the recovery of water-soluble cellulose acetate from the aqueous aliphatic acid solution in which said cellulose acetate is ripened to water-solubility and in which there is present an inorganic acid ripening catalyst employed in the ripening step, the steps which comprise neutralizing the inorganic acid ripening catalyst present in the aqueous aliphatic acid solution, and subjecting the resulting aliphatic acid solution of the cellulose acetate to extraction at a temperature of 10 to 70° C. with a substantially water-insoluble organic extractant for the aliphatic acid selected from the group consisting of ethyl acetate, butyl acetate, petroleum ether and mixtures thereof, isopropyl ether and mixtures of ethyl acetate and benzene whereby said aliphatic acid is substantially completely extracted therefrom.

4. Process for the recovery of water-soluble organic acid esters of cellulose from the aqueous aliphatic acid solution in which said esters are ripened to water-solubility and in which there is present an inorganic acid ripening catalyst employed in the ripening step, which comprises neutralizing the inorganic acid ripening catalyst present in the aqueous aliphatic acid solution, subjecting the resulting aliphatic acid solution of the organic acid ester of cellulose to extraction with a substantially water-insoluble organic extractant for the aliphatic acid selected from the group consisting of ethyl acetate, butyl acetate, petroleum ether and mixtures thereof, isopropyl ether and mixtures of ethyl acetate and benzene whereby said aliphatic acid is substantially completely extracted therefrom, and separating the water-soluble organic acid ester of cellulose from the water in which it is dissolved.

5. Process for the recovery of water-soluble organic acid esters of cellulose from the aqueous aliphatic acid solution in which said esters are ripened to water-solubility and in which there is present an inorganic acid ripening catyst employed in the ripening step, which comprises neutralizing the inorganic acid ripening catalyst present in the aqueous aliphatic acid solution, subjecting the resulting aqueous aliphatic acid solution of the organic acid ester of cellulose to extraction at a temperature of 10 to 70° C. with a substantially water-insoluble organic extractant for the aliphatic acid selected from the group consisting of ethyl acetate, butyl acetate, petroleum ether and mixtures thereof, isopropyl ether and mixtures of ethyl acetate and benzene whereby said aliphatic acid is substantially completely extracted therefrom, and separating the water-soluble organic acid ester of cellulose from the water in which it is dissolved.

6. Process for the recovery of water-soluble cellulose acetate from the aqueous acetic acid solution in which said cellulose acetate is ripened to water-solubility and in which there is present an inorganic acid ripening catalyst employed in the ripening step, which comprises neutralizing the inorganic acid ripening catalyst present in the aqueous acetic acid solution, subjecting the resulting aqueous acetic acid solution of the cellulose acetate to extraction with a substantially water-insoluble organic extractant for the aliphatic acid selected from the group consisting of ethyl acetate, butyl acetate, petroleum ether and mixtures thereof, isopropyl ether and mixtures of ethyl acetate and benzene whereby said acetic acid is substantially completely extracted therefrom, and separating the water-soluble cellulose acetate from the water in which it is dissolved.

7. Process for the recovery of water-soluble cellulose acetate from the aqueous acetic acid solution in which said cellulose acetate is ripened to water-solubility and in which there is present an inorganic acid ripening catalyst employed in the ripening step, which comprises neutralizing the inorganic acid ripening catalyst present in the aqueous acetic acid solution, subjecting the resulting aqueous acetic acid solution of the cellulose acetate to extraction with a substantially water-insoluble organic extractant for the aliphatic acid selected from the group consisting of ethyl acetate, butyl acetate, petroleum ether and mixtures thereof, isopropyl ether and mixtures of ethyl acetate and benzene whereby said acetic acid is substantially completely extracted therefrom, neutralizing any acid remaining and separating the water-soluble cellulose acetate from the water in which it is dissolved.

8. Process for the recovery of water-soluble cellulose acetate from the aqueous acetic acid solution in which said cellulose acetate is ripened to water-solubility and in which there is present an inorganic acid ripening catalyst employed in the ripening step, which comprises neutralizing the inorganic acid ripening catalyst present in the aqueous acetic acid solution, subjecting the resulting aqueous acetic acid solution of the cellulose acetate to extraction at a temperature of 10 to 70° C. with a substantially water-insoluble organic extractant for the aliphatic acid selected from the group consisting of ethyl acetate, butyl acetate, petroleum ether and mixtures thereof, isopropyl ether and mixtures of ethyl acetate and benzene whereby said acetic acid is substantially completely extracted therefrom, and separating the water-soluble cellulose acetate from the water in which it is dissolved.

9. Process for the recovery of water-soluble cellulose acetate from the aqueous acetic acid solution in which said cellulose acetate is ripened to water-solubility and in which there is present an inorganic acid ripening catalyst employed in the ripening step, which comprises neutralizing the inorganic acid ripening catalyst present in the aqueous acetic acid solution, subjecting the resulting aqueous acetic acid solution of the cellulose acetate to extraction at a temperature of 10 to 70° C. with isopropyl ether whereby said acetic acid is substantially completely extracted therefrom, and separating the water-soluble cellulose acetate from the water in which it is dissolved.

10. Process for the recovery of water-soluble cellulose acetate from the aqueous acetic acid solution in which said cellulose acetate is ripened to water-solubility and in which there is present an inorganic acid ripening catalyst employed in the ripening step, which comprises neutralizing the inorganic acid ripening catalyst present in the aqueous acetic acid solution, subjecting the resulting aqueous acetic acid solution of the cellulose acetate to extraction at a temperature of 10 to 70° C. with isopropyl ether whereby said acetic acid is substantially completely extracted therefrom, neutralizing any acetic acid remaining with sodium bicarbonate and separating the water-soluble cellulose acetate from the water in which it is dissolved.

11. Process for the recovery of water-soluble cellulose acetate from the aqueous acetic acid solution in which said cellulose acetate is ripened to water-solubility and in which there is present an inorganic acid ripening catalyst employed in the ripening step, which comprises neutralizing the inorganic acid ripening catalyst present in the aqueous acetic acid solution, subjecting the resulting aqueous acetic acid solution of the cellulose acetate to extraction at a temperature of 10 to 70° C. with a mixture of ethyl acetate and benzene whereby said acetic acid is substantially completely extracted therefrom, and separating the water-soluble cellulose acetate from the water in which it is dissolved.

12. Process for the recovery of water-soluble cellulose acetate from the aqueous acetic acid solution in which said cellulose acetate is ripened to water-solubility and in which there is present an inorganic acid ripening catalyst employed in the ripening step, which comprises neutralizing the inorganic acid ripening catalyst present in the aqueous acetic acid solution, subjecting the resulting aqueous acetic acid solution of the cellulose acetate to extraction at a temperature of 10 to 70° C. with a mixture comprising 70% of ethyl acetate and 30% of benzene whereby said acetic acid is substantially completely extracted therefrom, and separating the water-soluble cellulose acetate from the water in which it is dissolved.

13. Process for the recovery of water-soluble cellulose acetate from the aqueous acetic acid solution in which said cellulose acetate is ripened to water-solubility and in which there is present an inorganic acid ripening catalyst employed in the ripening step, which comprises neutralizing the inorganic acid ripening catalyst present in the aqueous acetic acid solution, subjecting the resulting aqueous acetic acid solution of the cellulose acetate to extraction at a temperature of 10 to 70° C. with a mixture comprising 70% of ethyl acetate and 30% of benzene whereby said acetic acid is substantially completely extracted therefrom, neutralizing any acetic acid remaining with sodium bicarbonate and separating the water-soluble cellulose acetate from the water in which it is dissolved.

ROBERT M. CREAMER.

REFERENCES CITED

The following references are of record in the file of this patent:

UNITED STATES PATENTS

| Number | Name | Date |
|---|---|---|
| 2,129,052 | Fordyce | Sept. 16, 1938 |

FOREIGN PATENTS

| Number | Country | Date |
|---|---|---|
| 401,918 | Great Britain | Nov. 23, 1933 |